March 27, 1962 — J. F. KOPCZYNSKI — 3,026,719
PROPULSION OF BODIES AT HIGH LINEAR SPEEDS
Filed Feb. 25, 1959 — 3 Sheets-Sheet 1

INVENTOR
John F. Kopczynski

March 27, 1962

J. F. KOPCZYNSKI 3,026,719

PROPULSION OF BODIES AT HIGH LINEAR SPEEDS

Filed Feb. 25, 1959

INVENTOR

John F. Kopczynski

March 27, 1962 J. F. KOPCZYNSKI 3,026,719
PROPULSION OF BODIES AT HIGH LINEAR SPEEDS
Filed Feb. 25, 1959 3 Sheets-Sheet 3
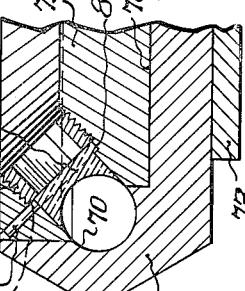
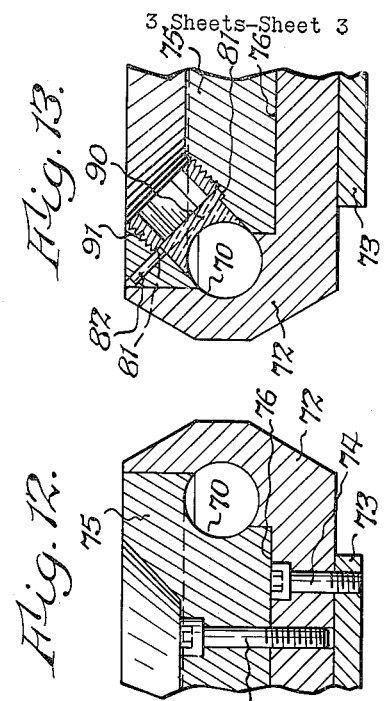
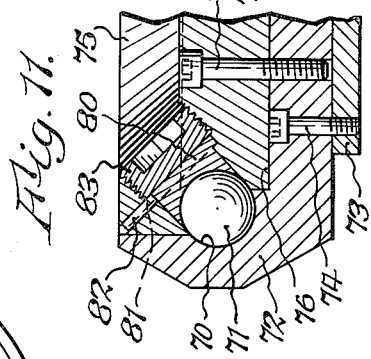
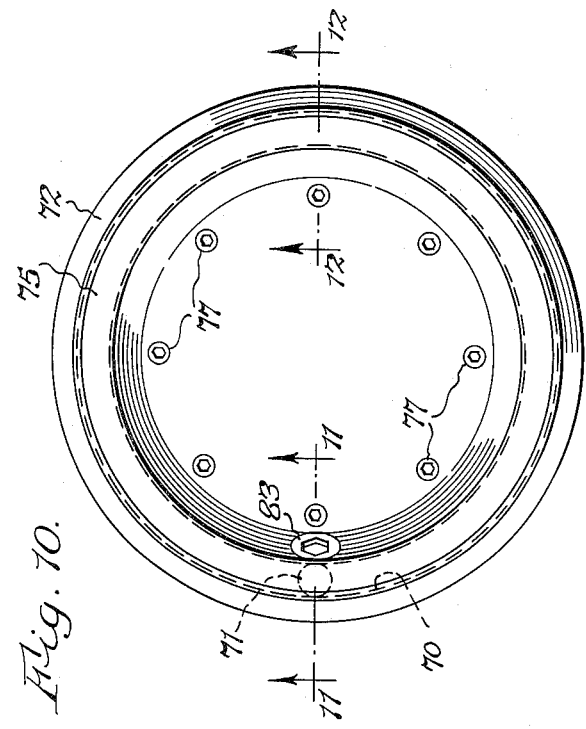
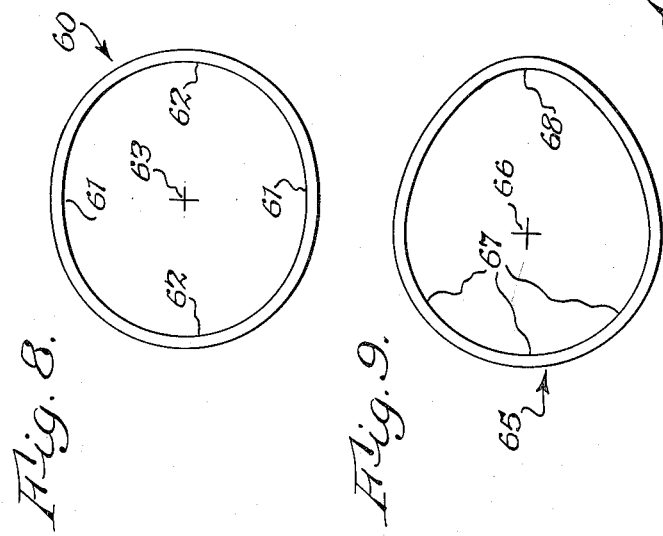
INVENTOR
John F. Kopczynski United States Patent Office 3,026,719
Patented Mar. 27, 1962

3,026,719
PROPULSION OF BODIES AT HIGH
LINEAR SPEEDS
John F. Kopczynski, 1671 Sweeney St.,
North Tonawanda, N.Y.
Filed Feb. 25, 1959, Ser. No. 795,493
20 Claims. (Cl. 73—88)

This invention relates to the propulsion of bodies at ultra or extremely high linear speeds continuously within one's field of observation. Intense interest is currently concentrated on the effect of ultra-high linear speeds on various bodies, and high velocity wind tunnels have not been entirely satisfactory for this purpose, and have had serious limitations as to speeds and visible inspection of bodies under high speed tests in the tunnel. Information is also sought on the physical changes, such as distortion, deformation, wear, temperatures and the like which occur in a body traveling at ultra-high linear speeds in ordinary, rarified, elevated and special atmospheres.

Objects of the invention are to provide devices for propelling bodies at ultra-high and variable linear speeds all along a track within the field of continuous view of a stationary person, with which the propelling means itself moves only at relatively slow speeds, and which are relatively simple, practical, compact, effective, convenient and inexpensive.

Other objects and advantages will appear from the following description of examples of the invention, and the novel features of the invention will be particularly pointed out hereinafter in connection with the appended claims.

In the accompanying drawings:

FIGS. 8 and 9 are diagrams illustrating other geometrical tracks along which a body may be propelled in accordance with this invention;

FIG. 10 is a plan of the body propelling member with a modified track;

FIGS. 11 and 12 are sectional elevations of parts of the same, with the sections taken along the lines 11—11 and 12—12 respectively in FIG. 10; and FIG. 13 is a sectional elevation similar to FIGS. 11 and 12, but with a sight glass along the inside of the track to enable observation of the track and an object in the track.

Figure 1:
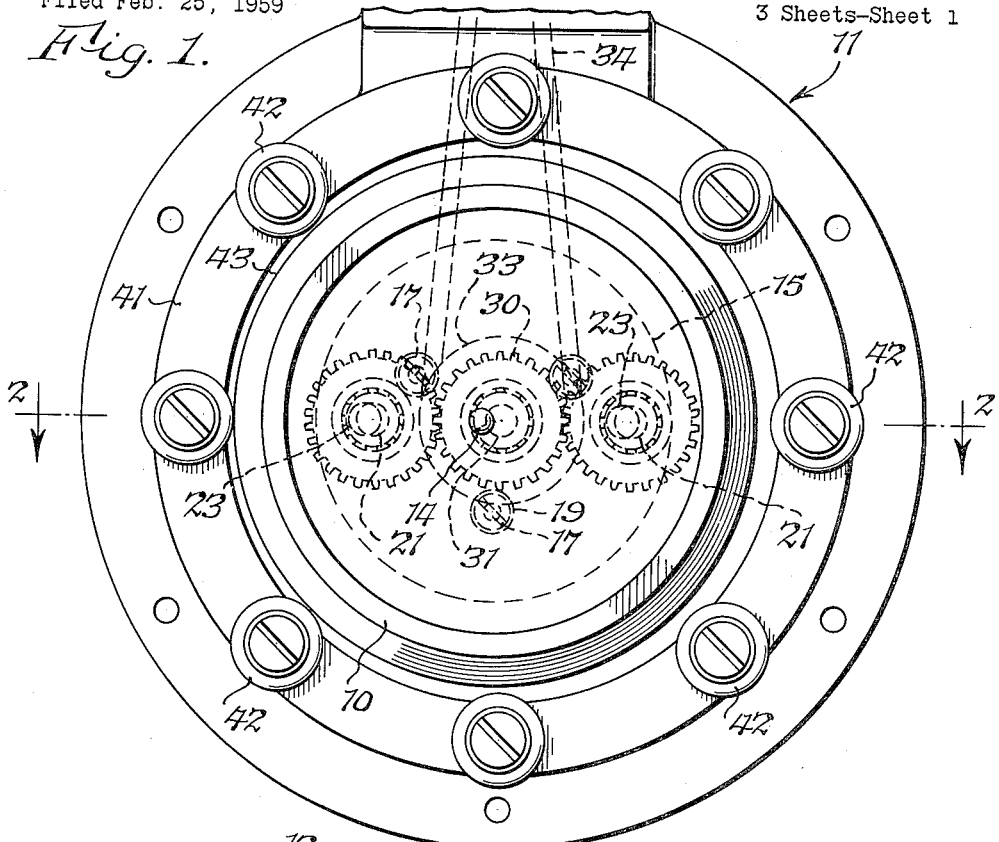
FIG. 1 is a plan of one device embodying the invention, with the driving means cut off.
Figure 2:
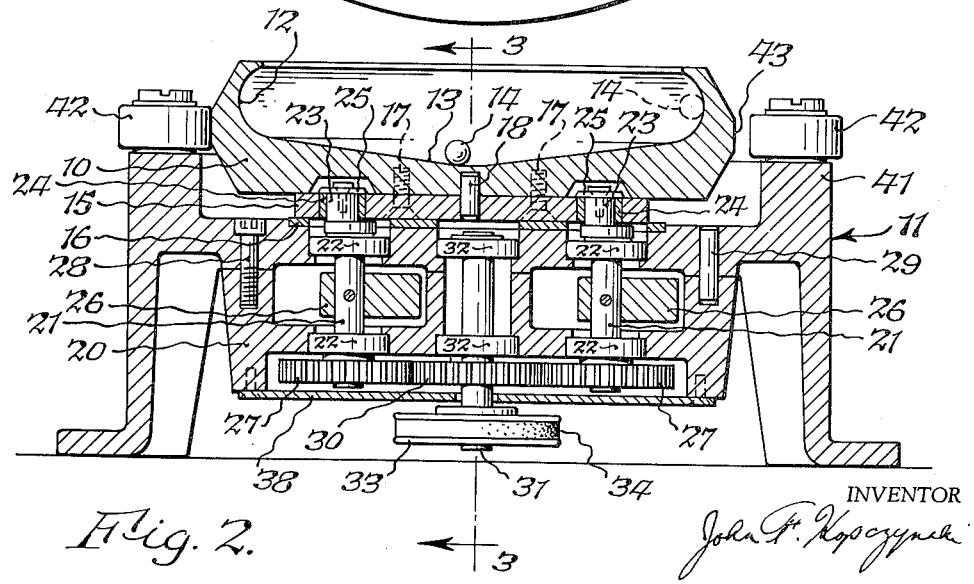
FIG. 2 is a vertical, sectional elevation of the same, with the section taken approximately along the line 2—2 of FIG. 1.
Figure 7:
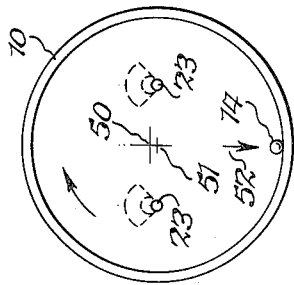
FIGS. 4 to 7 are diagrammatic views illustrating successive positions through which the body propelling member is moved by the gyration creating means in a complete cycle.
Figure 6:
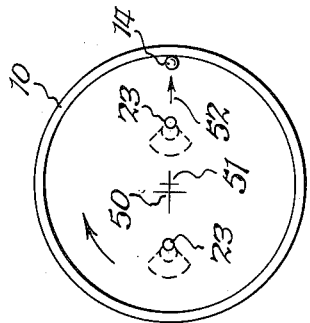
Figure 5:
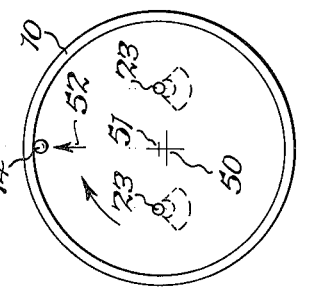
Figure 4:
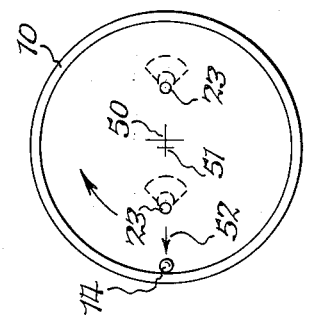
Figure 3:
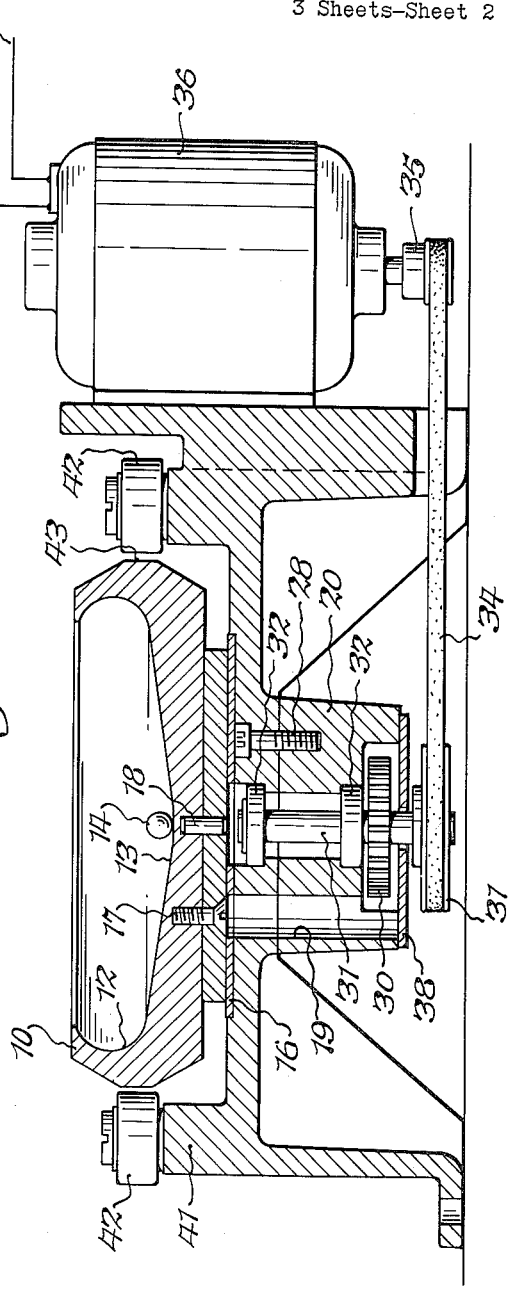
FIG. 3 is another vertical sectional elevation of the same, with this section taken in a plane approximately at right angles to the sectional plane of FIG. 2, that is, approximately along the line 3—3 of FIG. 2.

In the embodiment of the invention illustrated in FIGS. 1-7, a body propelling member 10 is mounted for sliding movement on the top of a base 11 that may be securely anchored to a foundation.

The member 10 has a recess in its top face, the peripheral wall 12 of which recess is a continuous endless track that is arcuate in transverse cross section, with the radius of curvature of the arc in cross section within the recess 12 and approximately in a plane containing the center line of the track, leaving an upwardly and inturned wall or flange defining the open face of the recess 12. The floor 13 of the recess is inclined toward the center of the recess, so that if a sphere or ball 14 is placed in the recess while the member 10 is not moving, it will roll or move to about the center of the floor of the recess.

The member 10 is secured to the top face of a plate 15 which rests upon and slides on a slab 16 of anti-friction or low friction bearing material that in turn is secured to an upper flat face of the base 11. A plurality of flat headed screws 17 pass upwardly through the plate 15 and are threaded into the member 10. The heads of screws 17 are countersunk in the lower face of the plate 15, and a dowel pin 18 centers the plate 15 and member 10 with each other. These screws 17 are accessible through apertures 19 (FIG. 1) in the base 11 and a sub-base 20 that is secured to the base 11. A pair of shafts 21 are rotatably mounted in both the base 11 and sub-base 20 in anti-friction bearings 22.

Fixed on the upper end of each shaft is a crank arm 23 that fits into a sleeve bearing 24 disposed in the plate 15. Cap screws 25 screwed to the crank arms 23, with their heads overlying the upper ends of the bearing sleeves 24, prevent lifting of the plate 15 when the bearings 23 are fixed in the plate 15, which eliminates any vertical movement of the member 11 when it is gyrated by rotation of said shafts. Counterweights 26 are fixed on the shafts 21 between the bearings 22 for each shaft at the diametrically opposite side of the shaft axis of rotation from the crank arms 23, so as to counterbalance the moving mass of the crank arms 23, the plate 15, and the member 10 with the moving body under test. Cap screws 28 and dowels 29 detachably connect the sub-base 20 to an underface of the base 11.

A gear 27 is fixed on the lower end of each shaft 21 just below the lowermost bearing 22 for that shaft. These gears are of equal size and mesh with a common gear 30 that is fixed on a central drive shaft 31. This shaft 31 is rotatably mounted in suitable bearings 32 that are spaced apart vertically in the base 11 and sub-base 20, and extends through a cover 38 on the bottom of the sub-base. A pulley 33 is fixed on the lower end of shaft 31. A belt 34 (FIG. 3) passes around pulley 33 and also around a pulley 35 fixed on the lower end of the rotor shaft of a variable speed motor 36 which provides a drive from the motor to the shafts 21. A variable resistance or other control 37 may be employed to selectively vary the speed of the motor 36 that is operated from a current supply 40.

The base 11 has an upwardly extending peripheral flange 41 which encircles the space in which the member 10 is disposed. A plurality of anti-friction devices such as rollers 42 are provided on the upper face of the flange 41, in precise positions that may successively engage with the outer periphery of member 10 as the latter gyrates under the action of the crank arms, and relieve the crank arm bearings and bearings 22 of excessive radial thrust as the member 10 is gyrated.

The crank arms 23 are in angularly similar positions on their shafts as shown particularly in FIGS. 4–7, so that when the shafts 21 are rotated by the motor, the crank arms will move the member 10 in a gyratory path, that is, a small, closed loop path or direction that is about parallel to the plane of the center line of the track 12. The diameter of the loop is determined by the throw of the crank arms, and there is no rotation of the member 10 about its axis, only the gyratory motion. The center line of the track 12 is considered to be a line along the greatest diameter of the track which is midway of the vertical dimension of the semicircular cross section of the track. It is approximately the part of the track where the ball 14 (shown in dotted lines in FIG. 2) is in contact with the track surface during its travel. The gyratory motion of member 10 is substantially parallel to that horizontal plane defined by the locus of the origins of the radii of the cross-sectional curvature of the track. This center line is also the longest linear path of the track along which a spherical body will roll under the instigation of said gyratory movement. The arcuate arrows in FIGS. 4–7 indicate only the direction of travel of the ball 14 as shown by its different position successively along the track. These successive positions of member 10 in its gyratory movement are illustrated in quarter revolution positions in FIGS. 4–7.

When the member 10 is given a gyratory movement, the ball, sphere or other body 14 will be propelled to ride up the inclined bottom 13 of the recess to the track 12 and then along the track, making one complete travel along the track for each complete gyration of member 10. Since the linear length of the track 12 is far greater than the length of travel of any part of member 10 in one complete gyration, and the ball or body 14 makes a complete circle of the track for each gyration of member 10, the ball will travel at a relatively high linear speed while the member 10 is moving in its path at a relatively low linear speed. Thus, the ball or body 14 can be propelled at a very high linear speed by very slow movements of mmeber 10. By increasing the gyratory speed of the member 10, one may obtain extremely high linear speeds of the body 14, even ultra-high linear speeds, without unduly high gyratory speeds of member 10 or of the shafts 21 and 31.

The arcuate track shape (in transverse cross section) with the inturned edge or flange along the open face of the recess in the top of member 10, effectively confines the ball or body 14 to the track at its high speeds, and the centrifugal forces acting on the ball or body keep it at the center of the concave track. The successive positions of the ball or body 14 along the track while the member 10 is moving in a gyratory path indicated by the arrows are shown in FIGS. 4–7. The ball or body will always seek the portion of the track furthest from the axis 50 of gyration of the member 10. The normal or actual center of the track 12 is indicated at axis 51 in FIGS. 4–7, so that its successive positions in a cycle are shown in FIGS. 4–7. Thus one may propel a ball or body along the track at extremely high speeds all within the field of observation of a person remaining in the same observation station.

In the example illustrated in FIGS. 1–7, the track 12 is circular, but other endless arcuate or curved, endless loop tracks may also be used. In FIG. 8 the track 60 corresponding to track 12 is elliptical with two opposite sides 61 of relatively long radii of curvature, and two opposite ends 62 of much shorter radii of curvature. With such a track the ball or body would receive an increase in its speed as it traveled from a side 61 to the next adjacent end 62, and then a decrease in its speed as it traveled from that end 62 to the next adjacent side 61. In this form of track the center 63 is equidistant from all opposite parts of the track.

In the form or shape of the track shown in FIG. 9, the track has a center 66 and the left half of the track has a constant radius from center 66. Its right half has an extended portion 68 with a greater radius from center 66 than for the left half. This would provide an acceleration of the body 14 when traveling from sides 67 to 68 and a deceleration when the body is traveling from sides 68 to 67. These examples of track shapes or paths in FIGS. 1–9 illustrate some of the many variations in the shape or path of the track that may be adopted depending upon the performance desired for the body in its travel along the track.

To get a body 14 up to speed and into a path of travel along the track, it is desirable to have it start its gyration in a small orbit and then have it spiral outwardly at a greater and greater circumference of travel until it reaches the track 12, otherwise if placed in the member while the latter is in operation, it would be likely to be bounced in straight lines while getting up to speed. This would place the body 14 and the track 12 of member 10 under impact forces that are undesirable. Another way to prevent this from happening would be to start the body 14 moving along the track as the gyratory operation of the member 10 was started.

In the embodiment of the invention illustrated in FIGS. 10–13, the track 70 is tubular and completely enclosed so that a spherical body 71 which is under test and of a diameter slightly less than the cross sectional diameter of the track, may traverse this enclosed track at a high linear speed. This track 70 is formed in a member 72 that is attached to a plate 73 by cap screws 74. The member 72 is given a gyratory movement in the same manner as explained in connection with FIGS. 1–7 for the member 10 and plate 15. An element 75 fills a recess 76 in the tip of member 72 and is confined therein by cap screws 77. The adjacent faces of member 72 and element 75 between which the enclosed or tubular track 70 is formed have their parting lines, or lines of abutment, located at the top and bottom of the track, remote from the riding path of strain and wear of the body 71.

A removable plug 80 having a slotted shoulder 81 and keyed by a pin 82 to element 75, enables access to be had to the endless tubular track so as to introduce the body 71 into the track or to remove it for inspection and replace it by another. A plug 83 is screwed into a passage by which plug 80 is inserted or removed, and serves to retain the plug 80 in position. The pin 82 and the slot in the shoulder 81 prevent rotation of the plug 80. Thus, if one desires to propel a body 71 at high speeds in a rarified atmosphere, or in an atmosphere of selected fluids other than normal air, this is possible by modifying the fluid in the track. When fluid pressures in track 70 above or below normal atmospheric pressure are desired, the joining or abutting surfaces of member 72 and element 75 have suitable sealing means interposed between them. Such seals can be paper sheets or sheets of other gasket materials.

In FIG. 13 a construction somewhat similar to that in FIGS. 10–12 is illustrated, but in FIG. 13 the plug 90 that corresponds to the plug 80 of FIGS. 10–12, is made of a transparent material and held in place by a tubular threaded plug 91 corresponding in function to plug 83 of FIGS. 10–12. One may look through the tubular plug 91 and transparent plug 90 to visually observe the body 71 as it passes. The element 75 may also be made of transparent material to enable continuous vision of the propelled body 71 as it moves along the track, because the centrifugal forces acting on the body 71 are in an outward direction against member 72, and not against element 75.

It will be apparent that by the use of a device embodying this invention, a compact and simple example of which has been illustrated and described, one may propel a body along a path at variable, extremely high or ultra-high linear speeds, continuously in view at all times, while the propelling means is operating at relatively low speeds.

It will be understood that various changes in the details, materials and arrangements of parts, which have been herein described and illustrated in order to explain the nature of the invention, may be made by those skilled in the art within the principle and scope of the invention as expressed in the appended claims.

I claim:

1. A device for propelling a body at an ultra high linear speed all within one person's range of view, which comprises a member having thereon an endless track along which track said body may travel repeatedly, and which confines said body thereto during its travel, and means for imparting to said member a gyratory movement whose maximum displacement is a small fraction only of the maximum distance across the loop of said track, and in a direction approximately parallel to a plane through the longest endless linear path of the track along which a spherical body on the track will roll under the instigation of such gyratory movement, whereby said gyratory displacement of said track will propel said body along said track through a complete cycle for each complete gyration of said member by said means.

2. A device according to claim 1 wherein said track on said member is arcuately concave in transverse cross section, the center of curvature of such concavity along the complete track is in a plane approximately parallel to said plane through said longest, endless, linear path of said track, and the upper edge portion of such concavity overhangs the centerline of said track to restrain said body from leaving said track.

3. The device according to claim 1, and means for varying the rate of said gyration of said member by said means to vary the speed of linear travel of said body along said track.

4. The device according to claim 1, and means engageable by said member in its gyrations for resisting forces tending to move said member in a larger path.

5. The device according to claim 4 wherein the last recited means comprises anti-friction elements arranged at intervals around the periphery of said member.

6. A device for propelling a body at a relatively high linear speed in comparison to the speed of its propelling medium, and all within a limited space, which comprises a member having a recess in a face thereof with an endless flange extending inwardly along the open face of said recess and with the side wall of the recess forming an inwardly facing track along which said body when it is placed in said recess may travel in a closed loop path, and means for imparting to said member a gyratory movement in a direction approximately parallel to said path and with a displacement in such gyratory movement which is a small fraction only of the maximum distance across said recess at said flange, whereby the gyratory movement of said member will propel said body, when on said track, through a complete cycle of travel around said track for each gyratory movement of said member.

7. A device for propelling a body at ultra-high linear speeds continuously within one's field of observation, which comprises a member, means for gyrating said member in a small closed loop path about a fixed axis, said member having an endless track for said body facing and encircling the axis of said gyratory path and confining said moving body to said path, when placed on said track, during its linear movement along the track, whereby when said means gyrates said member, said body will be caused to travel linearly around said track, once around for each gyration of said member.

8. The device as set forth in claim 7, and means arranged around said member and engaged by said member in succession during movement of said member for resisting forces tending to move said member in a larger path.

9. The device as set forth in claim 7, wherein said means for gyrating said member includes a pair of rotatable cranks pivotally connected to said member to impart gyrations to said member when said cranks are rotated.

10. The device as set forth in claim 7, wherein said means for gyrating said member includes a pair of rotatable cranks disposed on opposite sides of and at equal distances from said axis, and pivoted to said member to impart gyratory movements thereto when said cranks are rotated at the same speed and in the same directions, with their cranks similarly placed angularly on their axes of rotation.

11. The device as set forth in claim 7, wherein said track is tubular and has a part of its wall facing said axis of said gyratory path transparent to enable viewing of said body while it is traveling along and within said track.

12. The device as set forth in claim 7, and means for driving said means for gyrating said member selectively at any of a plurality of different speeds.

13. The device as set forth in claim 10, and means for driving said cranks at the same rotary speeds, selectively at any of a plurality of different speeds for selectively varying the linear speed of said body along said track.

14. A device for propelling a body at extremely high linear speeds continuously within one's field of view, which comprises a member having a recess opening through a face thereof, and having an endless track along the peripheral wall of said recess, and means operable on said member for imparting to it, a gyratory movement about a fixed axis in a closed loop path, with a maximum displacement that is only a small fraction of the minimum distance across said track, whereby the gyrations of said member will propel a body that may be placed in said recess, along said track for a complete cycle of travel at each one cycle of gyratory movement of said member.

15. The device according to claim 14, wherein said member rests and slides on a stationary plate, and said means includes two elements pivoted to the member at spaced apart areas thereof and rotated simultaneously in the same directions about parallel fixed axes in very small, closed loop paths.

16. The device according to claim 14, wherein the bottom of said recess is inclined downwardly from about said peripheral wall to about the center.

17. The device according to claim 14, wherein said means includes two cranks rotatable at the same speeds on parallel axes and pivotally connected to said member, with their offset portions disposed angularly in the same relative positions about their axes of rotation.

18. The device according to claim 17, wherein said cranks have equal throw when rotated.

19. The device according to claim 17, wherein said cranks have some counterbalancing means thereon.

20. The device according to claim 7, wherein said track is tubular and has a wall portion of transparent material forming a part of the inner periphery of the track.

References Cited in the file of this patent

UNITED STATES PATENTS

| | | |
|---|---|---|
| 529,766 | Wheeler | Nov. 27, 1894 |
| 936,645 | Luckenbach | Oct. 12, 1909 |
| 1,908,900 | Keet | May 16, 1933 |
| 2,016,779 | Hardgrove | Oct. 8, 1935 |
| 2,261,257 | Kiesskalt et al. | Nov. 4, 1941 |
| 2,357,199 | Holst | Aug. 29, 1944 |

FOREIGN PATENTS

| | | |
|---|---|---|
| 36,858 | Germany | Sept. 15, 1886 |